United States Patent [19]

Smith

[11] Patent Number: 5,759,001
[45] Date of Patent: Jun. 2, 1998

[54] BLIND RIVET

[75] Inventor: Daniel Robin Smith, Castle Bromwich, United Kingdom

[73] Assignee: Emhart Inc., Newark, Del.

[21] Appl. No.: 713,186

[22] Filed: Sep. 12, 1996

[30] Foreign Application Priority Data

Sep. 23, 1995 [GB] United Kingdom ............... 9519476

[51] Int. Cl.⁶ ........................... F16B 13/04; F16B 13/06
[52] U.S. Cl. ........................ 411/43; 411/34; 411/70
[58] Field of Search ........................ 411/34–38, 41, 411/43, 69, 70, 107, 360, 361

[56] References Cited

U.S. PATENT DOCUMENTS

| 2,635,501 | 4/1953 | Eichner. | |
| 3,452,638 | 7/1969 | Lauer. | |
| 4,069,738 | 1/1978 | McClure | 411/34 |
| 4,306,824 | 12/1981 | Tanaka et al. | 411/70 X |
| 5,275,519 | 1/1994 | Hainke et al. | 411/34 |
| 5,320,465 | 6/1994 | Smith | 411/43 |
| 5,354,160 | 10/1994 | Pratt et al. | 411/361 X |

FOREIGN PATENT DOCUMENTS

| 499352 | 8/1992 | European Pat. Off. . |
| 2519393 | 7/1983 | France . |
| 2430534 | 1/1976 | Germany . |
| 3245055 | 6/1984 | Germany . |

*Primary Examiner*—Neill R. Wilson
*Attorney, Agent, or Firm*—E. D. Murphy

[57] ABSTRACT

An improved blind rivet assembly is disclosed, in which a plastics cylinder is moulded along a pulling stem of a long break mandrel. On setting the mandrel is broken within the cylinder providing the cylinder with an additional degree of shear strength, allowing the cylinder to be used as a support.

4 Claims, 3 Drawing Sheets

BLIND RIVET

BACKGROUND OF THE INVENTION

The invention relates to an improved blind rivet.

Blind rivets typically comprise a mandrel and a rivet sleeve. The sleeve is generally tubular and provided with a flange at one end. The mandrel comprises a head and a pulling stem. The pulling mandrel extends through the flanged end of the sleeve. In use the rivet sleeve passes through a hole in a workpiece with the flange abutting a surface of the workpiece. The side of the workpiece from which the rivet is inserted will be referred to as the operator side of the workpiece and the other side to which the operator may not normally have access will be referred to as the blind side of the workpiece. The rivet is held in place by a force on the flange and the pulling stem of the mandrel is pulled to set the rivet assembly. As a result the rivet sleeve deforms on the blind side to secure the rivet in position. Further pulling results in the pulling stem breaking, usually at a predetermined breakneck position.

When securing a second workpiece to a first, it is sometimes useful to hold the second workpiece in a fixed position relative to the first and then secure the workpieces together using a permanent fixing. This may be achieved for example by clamping the second workpiece in position and the removing the clamps. Sometimes, however, it is as difficult to secure the workpieces using the clamps as using permanent fasteners.

The blind rivet of the present invention aims to provide a fixing by which a second workpiece may be held temporarily in position in relation to a first workpiece to allow permanent securing of the workpieces.

According to a first aspect of the invention a blind rivet comprises a sleeve having a flange at one end and a mandrel having a head, a breakneck portion and a pulling stem characterised in that a plastics cylinder is moulded around the pulling stem and abuts the flange of the rivet sleeve, and upon setting at least a part of the pulling stem is retained within the plastics cylinder.

In a preferred embodiment the sleeve is a blind sleeve and the mandrel head is secured within the blind sleeve at the end of the sleeve remote from the flange.

In an alternative embodiment the rivet sleeve remote from the flange may be open with the mandrel head abutting the open end of the sleeve. In an alternate form of this embodiment the rivet sleeve may have holes or slots in the sleeve.

According to a second aspect of the invention a method of locating a second workpiece to a first workpiece for subsequent permanent securing of the workpieces comprises the steps of:

a) taking a first workpiece having a plurality of holes formed therein;

b) taking a second workpiece having a plurality of locating features formed therein;

c) placing a rivet according to the first aspect of the invention into a hole in the first workpiece with the flange abutting the first workpiece, and pulling the pulling stem to set the rivet;

d) repeating step c) a number of times;

e) positioning the second workpiece by guiding the locating features in the second workpiece over the plastics cylinders until the second workpiece is in position; and f) permanently securing the workpieces together.

Since a portion of the pulling mandrel is within the plastics cylinder this provides the plastics cylinder with an additional degree of shear strength it would otherwise not possess and allows the rivet to support the second workpiece for a time.

BRIEF DESCRIPTION OF THE DRAWINGS

The invention will now be described, by way of example only, with reference to the accompanying drawings, in which.

Figure 1:
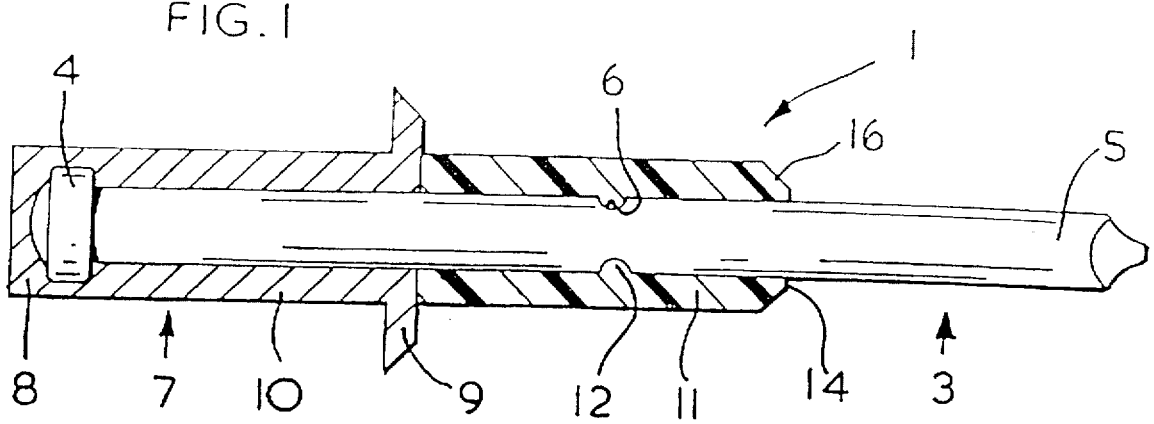
FIG. 1 shows an improved rivet assembly according to the present invention.

Referring to the drawings the rivet assembly 1 is shown inserted in a hole in a workpiece 2.

DESCRIPTION OF THE PREFERRED EMBODIMENT

The rivet assembly shown uses a closed end blind rivet, and comprises a mandrel 3 located within a rivet sleeve 7. The mandrel 3 used with the assembly is a long break mandrel, that is a mandrel comprising a mandrel head 4, a pulling stem 5 and a breakneck portion 6, the breakneck portion located in use beyond a flange of the rivet sleeve, rather than near to the mandrel head. Thus on setting and fracture of the mandrel at the breakneck portion a comparatively long portion of the mandrel remains in the set assembly.

The rivet sleeve 7 comprises a cylinder closed at one end 8 and provided with a flange 9 at the other end extending away from the cylinder forming the shank 10 of the rivet sleeve.

In practice the rivet sleeve is extruded over the mandrel so that the rivet sleeve is in intimate contact with the mandrel.

Figure 6:
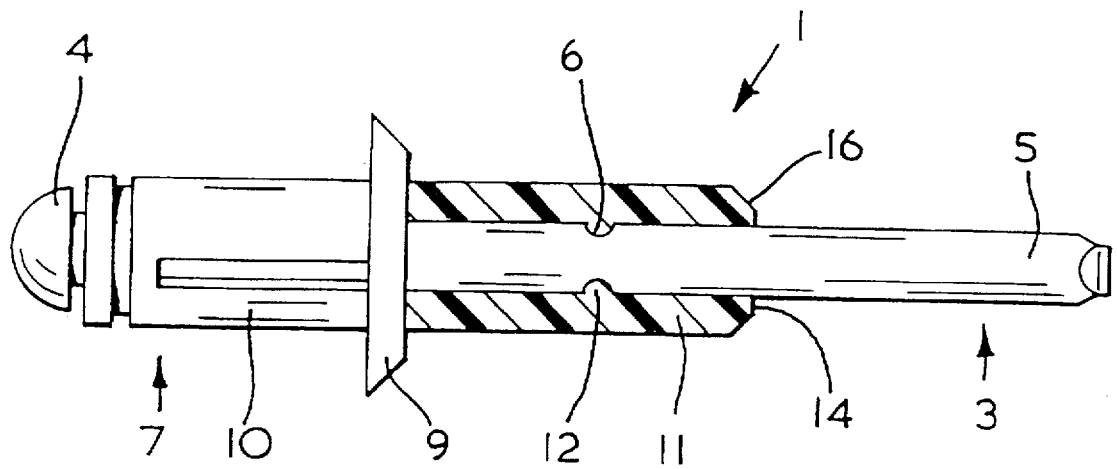
FIG. 6 shows a further embodiment of the improved rivet assembly shown in FIG. 4.
Figure 7:
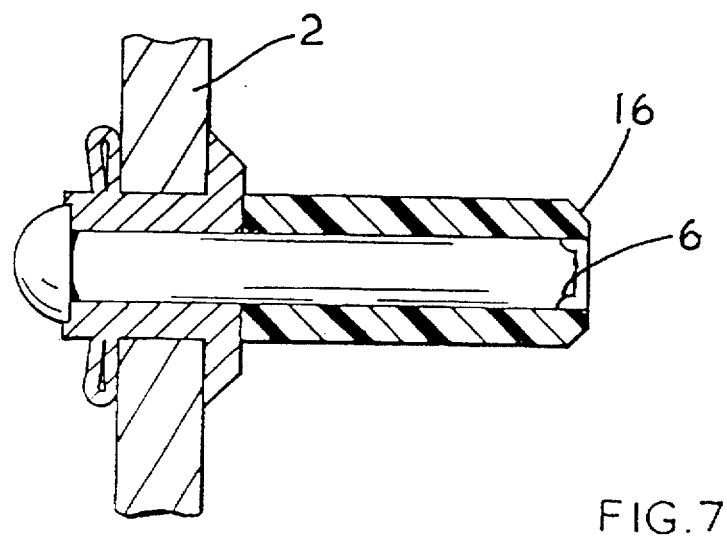
FIG. 7 shows the rivet assembly of FIG. 6 in the set position.

An alternative embodiment is shown in FIGS. 4–7, in which the rivet sleeve 7 is shown to have an open end adjacent the mandrel head 4 and a series of slots or holes therein (see FIG. 6). The numbers shown in FIGS. 4–7 correspond to the numbers shown in FIGS. 1 and 2, and it should be understood that FIGS. 4 and 6 correspond to FIG. 1, and FIGS. 5 and 7 correspond to FIG. 2.

A plastics cylinder 11 is moulded to the flange of the rivet assembly and extends along an exposed portion of the pulling stem 5. A portion 12 of the plastics material fills the breakneck portion 6 of the mandrel.

Figure 2:
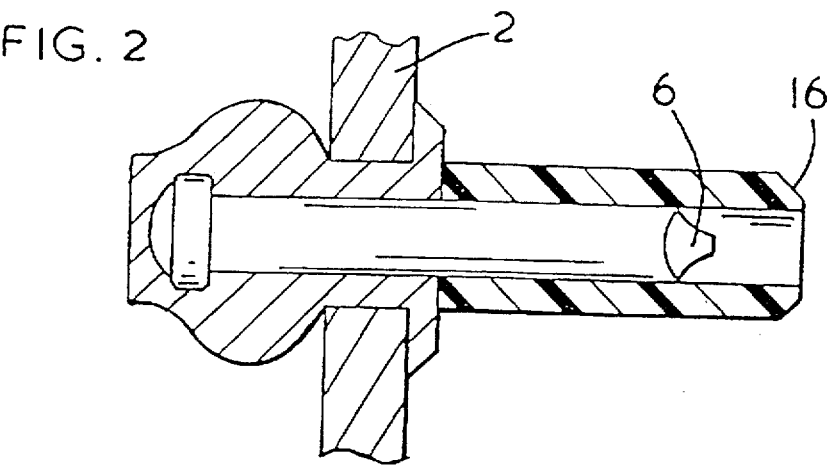
FIG. 2 shows the rivet assembly of FIG. 1 in a set condition.
Figure 3:
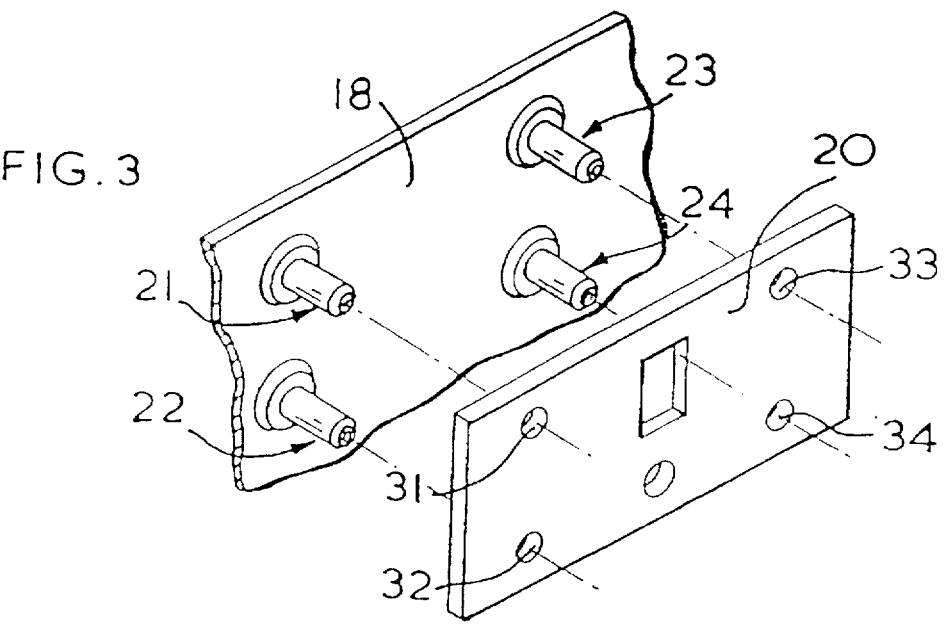
FIG. 3 shows a second workpiece to be supported by a rivet assembly according to the present invention for securing to a first workpiece.
Figure 4:
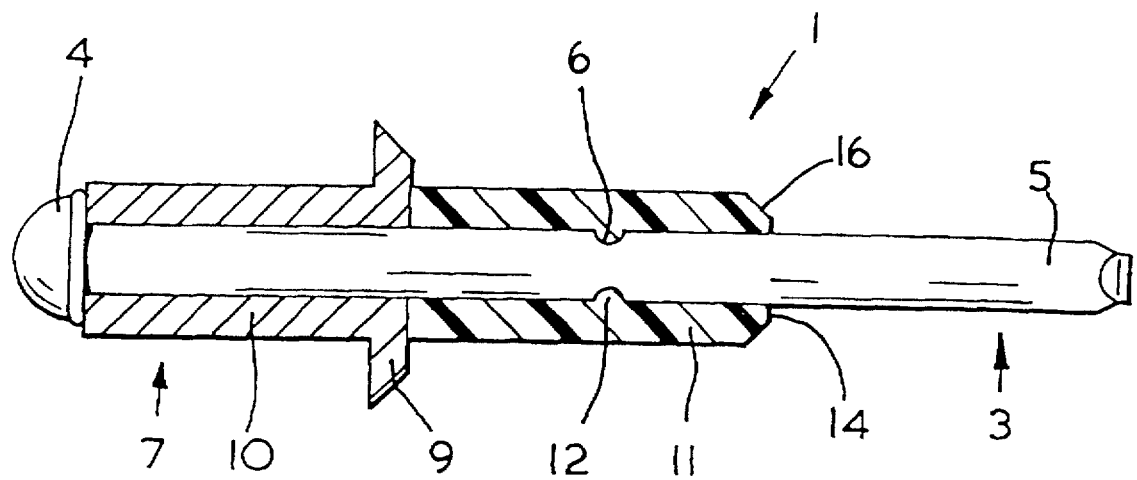
FIG. 4 shows an alternative embodiment of the improved rivet assembly shown in FIG. 1.
Figure 5:
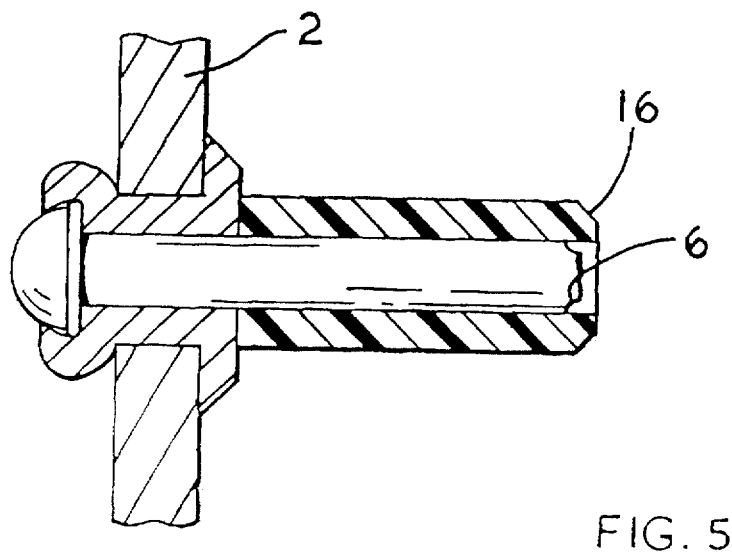
FIG. 5 shows the rivet assembly of FIG. 4 in the set position.

To set the assembly the exposed portion of the flange is held against the workpiece. The pulling stem 5 and the plastics cylinder 11 are supported by a setting tool. An end surface 14 of the plastics sleeve remote from the flange is abutted by the setting tool. That portion of the pulling stem extending beyond the plastics cylinder is gripped by pulling jaws of the setting tool. Operation of the setting tool then causes the pulling stem 5 to move relative to the flange 9. Since the plastics cylinder 11 is held in relation to the flange.

the mandrel moves within the plastics cylinder causing the portion 12 of plastics material filling the breakneck portion 6 of the mandrel to shear off from the cylinder. The mandrel head 4 is held at the blind end 8 of the rivet sleeve, and the shank 10 of the rivet sleeve deforms causing a bulge 15 on the blind side of the workpiece to form. Once a certain degree of deformation of the flange has been reached the mandrel will fracture at the breakneck portion. In the present case the fracture will occur within the plastics cylinder (FIG. 2). Such a rivet assembly may be used to support a second workpiece 20 to a first workpiece 18 to which it is secured to allow the second workpiece itself to be permanently secured to the first workpiece.

The end of the plastics cylinder remote from the rivet flange 9 may conveniently be formed with a chamfer 16. This chamfer 16 can then act as a lead-in for a second workpiece which is temporarily to be supported on the set rivet assembly.

This may be achieved by using a number of the rivets described and setting them in a first workpiece to provide a number of locating pins (21-24). A second workpiece is placed over the plastics cylinders and is supported thereby. The second workpiece may be provided with holes (31-34), bores, or other locating features to allow it to be supported on the plastics cylinders. The second workpiece can then be permanently secured to the first.

It will be seen that the presence of the broken mandrel within the cylinder provides an added degree of shear strength to the plastics cylinders.

While the invention has been described by use with a closed end mandrel, it will be understood that other forms of rivet having a long break mandrel may be used, such as open ended rivets, load spreading rivets or even peel rivets.

What is claimed is:

1. A blind rivet comprises a sleeve having a flange at one end and a mandrel having a head, a breakneck portion and a pulling stem characterised in that a plastics cylinder is moulded around the pulling stem and abuts the flange of the rivet sleeve, and upon setting at least a part of the pulling stem is retained within the plastics cylinder.

2. A blind rivet according to claim 1, characterised in that the sleeve is a blind sleeve and the mandrel head is secured within the blind sleeve at the end of the sleeve remote from the flange.

3. A blind rivet according to claim 1, characterised in that an end of the sleeve remote from the flange is open, the open end of the sleeve adjacent the mandrel head, the pulling stem extending through the rivet sleeve.

4. A blind rivet according to claim 3, characterised in that the rivet sleeve has slots or holes extending from the flange towards the end of the sleeve remote from the flange.

* * * * *